United States Patent
Lee et al.

(10) Patent No.: US 7,996,450 B1
(45) Date of Patent: Aug. 9, 2011

(54) NETWORK-BASED FILE ACCESS SYSTEM

(75) Inventors: Sharon A. Lee, Nashua, NH (US);
David L. Diamond, Hollis, NH (US);
Michael S. Rubino, Nashua, NH (US);
Guozhong Wang, Nashua, NH (US)

(73) Assignee: Oracle International Corp., Redwood Shores, CA (US)

( * ) Notice: Subject to any disclaimer, the term of this patent is extended or adjusted under 35 U.S.C. 154(b) by 396 days.

(21) Appl. No.: 09/953,083

(22) Filed: Sep. 14, 2001

Related U.S. Application Data

(60) Provisional application No. 60/232,915, filed on Sep. 15, 2000.

(51) Int. Cl.
*G06F 7/00* (2006.01)
*G06F 17/00* (2006.01)
*G06F 17/30* (2006.01)
*H04N 7/173* (2011.01)

(52) U.S. Cl. .......................... 707/899; 707/609; 725/121

(58) Field of Classification Search .................. 707/10, 707/102; 705/1; 709/223–225, 217; 345/735; 715/744; 718/107; 717/100
See application file for complete search history.

(56) References Cited

U.S. PATENT DOCUMENTS

| | | | | |
|---|---|---|---|---|
| 5,802,518 | A * | 9/1998 | Karaev et al. | 707/9 |
| 5,933,811 | A * | 8/1999 | Angles et al. | 705/14 |
| 6,385,591 | B1 * | 5/2002 | Mankoff | 705/14 |
| 6,401,239 | B1 * | 6/2002 | Miron | 707/203 |
| 6,631,378 | B1 * | 10/2003 | Rosinus et al. | 707/802 |
| 6,738,155 | B1 * | 5/2004 | Rosenlund et al. | 358/1.15 |
| 6,757,696 | B2 * | 6/2004 | Multer et al. | 707/201 |
| 6,975,835 | B1 * | 12/2005 | Lake et al. | 455/3.01 |
| 7,194,757 | B1 * | 3/2007 | Fish et al. | 725/121 |

OTHER PUBLICATIONS

Xdrive Technologies, "X: drive—What is X: drive?", http://web.archive.org/web/19991125121950/http://www.xdrive.com/whatis.html, Xdrive Technologies (1999).

* cited by examiner

*Primary Examiner* — Susan Y Chen

(57) ABSTRACT

A network-based file access system obtains an identifier for a resource stored on a remote storage system to an application. The application can use the identifier to pull the contents of a file associated with the identifier or to push contents of a file to a folder associated with the identifier.

45 Claims, 10 Drawing Sheets

NETWORK-BASED FILE ACCESS SYSTEM

RELATED APPLICATION

This application claims the benefit of U.S. Provisional Application No. 60/232,915, filed on Sep. 15, 2000. The entire teachings of the above application are incorporated herein by reference.

BACKGROUND

A web application is any application (computer program) that includes a user interface for display by a web browser. Typically, the web browser executes on a client and the web application executes on a web server. The web browser displays the web applications' user interface on the client.

There are currently a multitude of web applications that allow a user to provide a copy of the contents of a file stored on a user's local file system to the web application, that is, to pull the contents of the file to the web application. However, these web applications require that the file (or a copy) be stored in the user's local file system. Thus, to allow file pulls to a web application, the client includes local storage.

With the availability of on-line storage sites, many files are stored on remote database servers instead of being stored locally. Thus, pulling a file from a remote database server to a web application includes a multi-stage copy process. The file is first copied to local storage, and then the locally-stored file is copied to the web application. For example, a web application executing on a web server provides a user interface displayed by a web browser in the client to allow a user on the client to create a web page. To add an image stored on a database server to the web page stored on the first server, the client pulls the image file from the database server by first copying the image file, saving the copied image file to local storage on the client, then copying the locally stored image file to the web server. Similarly, to push an image file into the database server, the client must first copy the file from the web application, save the copied file to local storage, then copy the locally-stored file to the remote storage system. The additional step of copying the file to local storage before copying the file to the web application consumes network bandwidth. Also, a file cannot be copied to a web application by a client lacking sufficient local storage.

On-line storage web sites provide a method for pushing the contents of files directly from a web application executing in a web server to an on-line remote storage site. However, the ability to select the destination location within the on-line remote storage system is not provided.

SUMMARY

A method in accordance with embodiments of the invention facilitates access to resources for/from a web application. Resources stored on a remote storage system are displayed. Upon selection of one of the displayed resources, an identifier associated with the selected resource is pulled from the remote storage system to the application for use by the application. The selected resource can be a file and the application can use the identifier associated with the file to pull the contents of the file from the remote storage system to the application.

User authentication can be performed before displaying the resources stored on the remote storage system. The resources displayed can be the contents of a user's account stored on the remote storage system. The displayed resources can be obtained by issuing a database query to a database stored on the remote storage system. The application can be a web application, the resources can be displayed in a browser window and the identifier can be a Uniform Resource Locator ("URL").

In particular, a popup button can be displayed by the web application. Upon selection of the popup button, the web application can open a browser window for a popup servlet executing on the on-line remote storage system. The popup servlet can then display items stored on the on-line remote storage system in the browser window. Upon selection of an item displayed in the browser window, the popup servlet can obtain a Uniform Resource Locator associated with the selected item from the remote storage system for use by the web application and the browser window is closed.

The popup servlet can perform user authentication before displaying items stored on the on-line remote storage system. The browser window can be used to push a file from the web application to the on-line remote storage system or to pull the contents of a file stored on the on-line remote storage system to the web application. To save a file in the on-line remote storage system, the user selects a folder from the popup display. The web application uses the URL associated with the folder to save a file by pushing the contents of the file for the web application to the on-line remote storage system. To pull contents of a file stored on the on-line remote storage system, the selected item is the file to be pulled, the web application uses the URL associated with the file to pull the contents of the file stored on the on-line remote storage system to the web application.

The items displayed in the browser window may be the contents of a user's account stored on the on-line remote storage system. The items can be displayed after issuing a database query to a database stored on the on-line remote storage system.

BRIEF DESCRIPTION OF THE DRAWINGS

The foregoing and other objects, features and advantages of the network-based file access system will be apparent from the following more particular description of particular embodiments, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
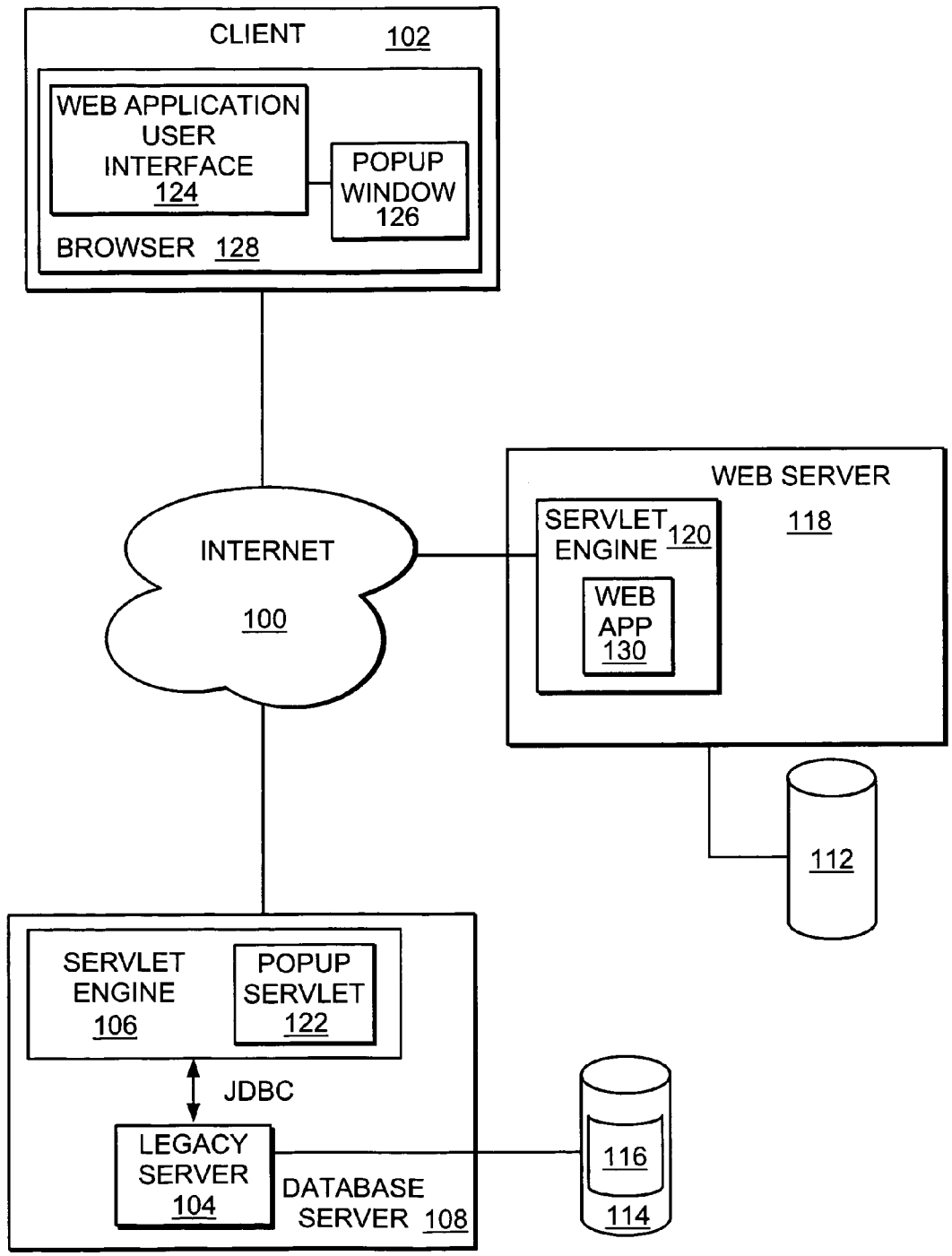
FIG. 1 is a block diagram of a particular network-based file access system.

FIG. 1 is a block diagram of a particular network-based file access system. As shown, a client 102, web server 118 and database server 108 communicate over a communications network, such as the Internet 100. A web application 130 executes in a servlet engine 120 in the web server 118. The web application's user interface 124 is displayed by a browser 128 executing on the client 102. A popup servlet 122 executes in a servlet engine 106 in a database server 108. The popup servlet 122 provides web-based access to resources, for example, files 116 stored on on-line remote storage 114 in the database server 108.

Upon receiving a request for display of resources stored in the database server 108, the web application 130 invokes a popup window 126 for displaying the resources stored in the on-line remote storage 114. The popup window 126 is displayed by the browser 128 on the client 102. The popup window 126 uses a Hypertext Transfer Protocol ("HTTP") based on the Hypertext Markup Language ("HTML") browser interface. The contents of the on-line remote storage 114 displayed can be limited to resources accessible to the user, for example, the files stored in a user's account or briefcase.

The database server 108 includes a legacy server 104. The legacy server 104 manages files 116 stored in the on-line remote storage 114. Files can be accessed through the legacy server 104 through a relational database, such as Java Database Connectivity ("JDBC"). JDBC is an Application Program Interface ("API") specification that allows encoding of access request statements in Structured Query Language (SQL). The statements are forwarded to the legacy server 104 that manages the database. In an alternate embodiment, the popup servlet 122 can communicate with the legacy server 104 to access the database using Common Object Request Broker Architecture ("CORBA") Internet Inter-ORB-Protocol ("IIOP").

The popup servlet 102 is written in the java language. The servlet engine 106 executes the popup servlet 102. The servlet engine 106 processes requests for access to servlets from the client 102 and forwards the received requests to the requested servlet. The popup servlet 122 processes requests received from the servlet engine 106. The popup servlet 122 includes standard java servlet methods including an init method, a get method, a put method and a destroy method. The servlet engine 106 executes the popup servlet's init method when loading the popup servlet 122. The popup servlet 122 executes in the database server 108 until it is destroyed through a call to the popup servlet's destroy method.

A user can select a resource displayed in the popup window 126. The resource can be a folder or a file. The popup servlet 122 obtains an identifier associated with the selected item in the popup window 126 displayed by the browser 128 to the web application's user interface 124. For example, the identifier can be a Uniform Resource Locator ("URL"). The URL is obtained by sending a copy of the identifier to the web application's user interface 124. The browser 128 obtains the URL for the web application 130. After receiving the URL from the browser 128, the web application 130 can use the URL to pull the contents of a file associated with the URL directly from the database server 108 to the web server 118 or to push a file to the folder associated with the URL. For example, the contents of a file stored on on-line remote storage 114 can be pulled directly from the database server 108 to the web server 118 over the Internet 100 by transferring the contents of the file to the web server after the URL associated with the file is obtained for the web application 130 by the browser 128.

Figure 2A:
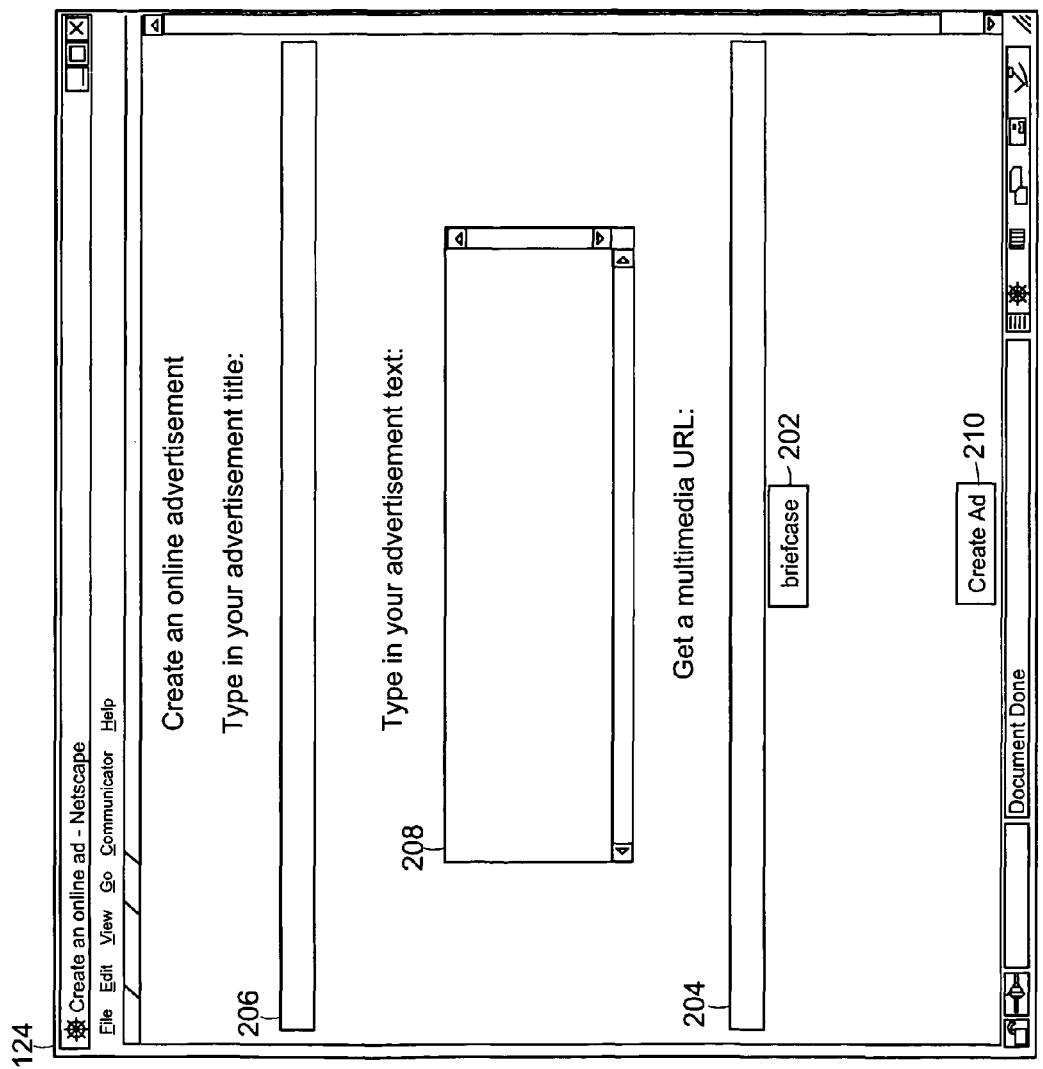
FIG. 2A is a web application's user interface for the particular network-based file access system application.

FIG. 2A is a web application's user interface for the particular network-based file access system application. The web application's user interface 124 displays a form. The form allows a user to create an on-line advertisement. Three input fields are provided in the web application's user interface 124. Field 206 allows the input of text for the advertisement title. Field 208 allows input of text to be displayed for the advertisement and field 204 allows input of a URL to be displayed with the advertisement. A briefcase button 202 allows the user to get a URL associated with a file stored in the user's briefcase on database server 108. The URL is displayed in field 204.

After input to all fields 204, 206, 208 has been completed, the user selects the create add button 210 to create the advertisement. For example, selecting the create add button 210 can store the displayed form including the data input into fields 204, 206 and 208 in a database.

After the create add button 210 is selected, the browser 128 gets the URL displayed in the URL field 204 for the web application 130 in a HTTP POST request. The web application 130 can use the received URL to request a pull of the contents of the file associated with the URL.

For example, having received the URL associated with the file, the web application 130 can pull the contents of file using Java's HTTPURLConnection class. If basic authentication information is required when retrieving the file, the popup servlet 122 can prompt the user for the information and use the HTTPURLConnection setRequest_Property( ) method as follows:

urlConn.setRequest_Property("Authorization", "Basic"+ encoding);

where encoding is the username:password Base 64 encoded.

Figure 2B:
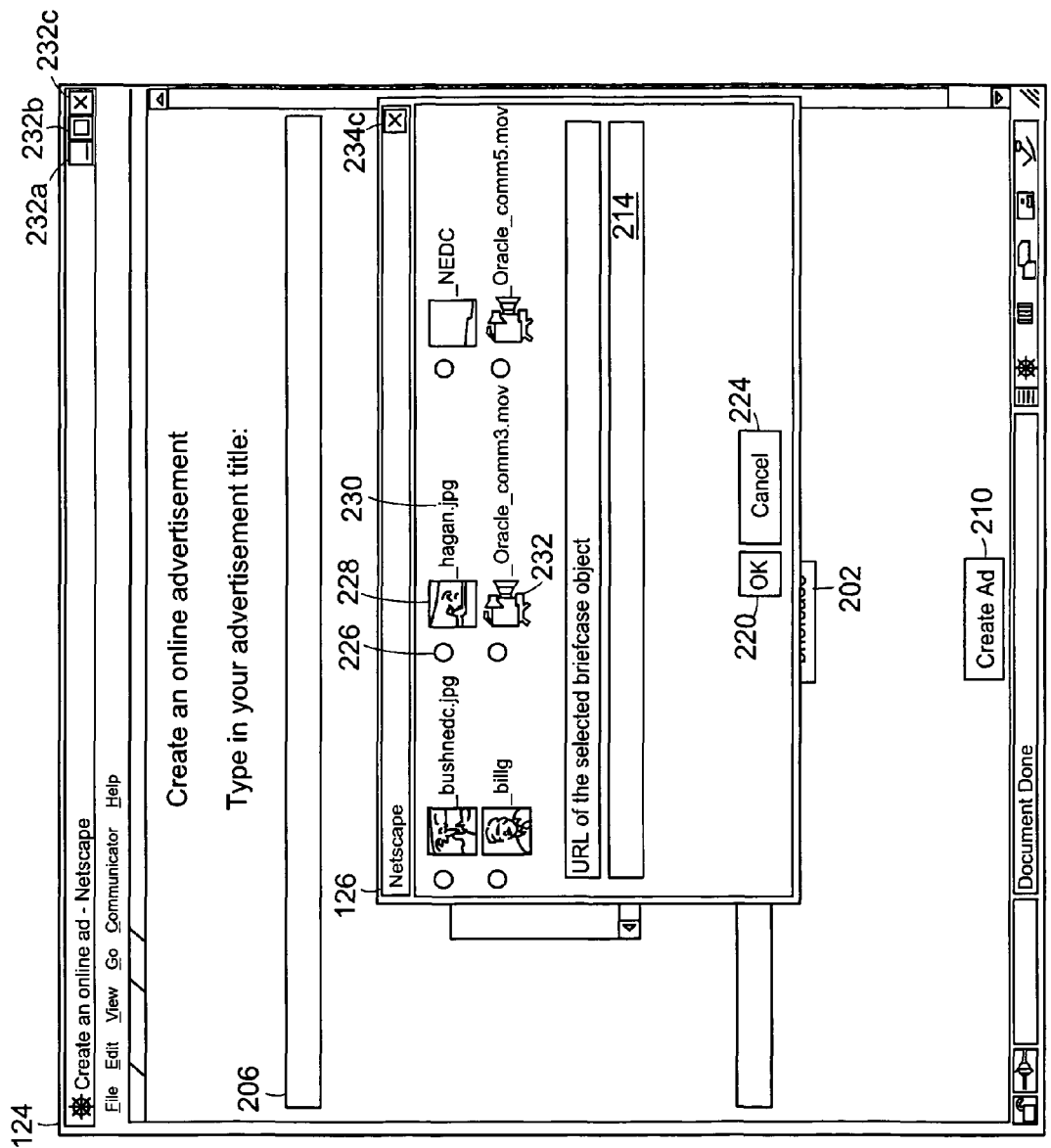
FIG. 2B is the web application's user interface displaying the popup window after the briefcase button has been selected.

FIG. 2B is the web application's user interface displaying the popup window after the briefcase button has been selected. The popup window 126 overlays the web application's user interface 124. A list of files in the user's account stored in remote storage 114 (FIG. 1) on the server 106 (FIG. 1) is displayed. A radio button 226, an icon or thumbnail 228 and a filename 230 are displayed for each file. A thumbnail of an image is displayed with each image file. An icon is displayed with each video file. For example, a video camera icon is displayed 232 for video file Oracle-comm3.mov. Each file displayed in the popup window 126 has an associated URL which is not displayed.

The popup window 126 displays a default title "Netscape" in the title bar because the popup window 126 is a browser window that is displayed using Netscape's web browser. The browser vendor's name is automatically added to the end of the text in the title bar of the browser window by the browser 128 in all browser windows opened while the browser 128 is executing. Thus, when executing the Netscape browser, "Netscape" is added to the end of the application title bar text "Create an on-line ad" so that "Create an on-line ad—Netscape" is displayed in the application title bar as shown in FIG. 2A. In an alternative embodiment, the popup window 126 can be displayed by other web browsers, such as Microsoft's Internet Explorer.

A file is selected for obtaining the URL associated with the file for the web application's user interface 124 (FIG. 1) by selecting the radio button 226 associated with the filename text 230. A cancel button 224 is provided to allow the user to cancel the request for obtaining the URL associated with the selected file. An OK button 220 is provided to allow the user to request he URL associated with the selected file.

The web application's user interface 124 includes standard minimize 232a, maximize 232b and close 232c buttons allowing the web application's user interface 124 to be maximized, minimized, and closed. However, the popup window 126 only includes the standard close 232c button. Thus, the popup window 126 cannot be minimized or maximized. Instead, the popup window 126 is maximized or minimized together with the application window when the application's maximize 232a or minimize 232b button is selected. However, the popup window 126 can be closed by selecting the window close button 234c to call the standard windows close function.

Figure 2C:
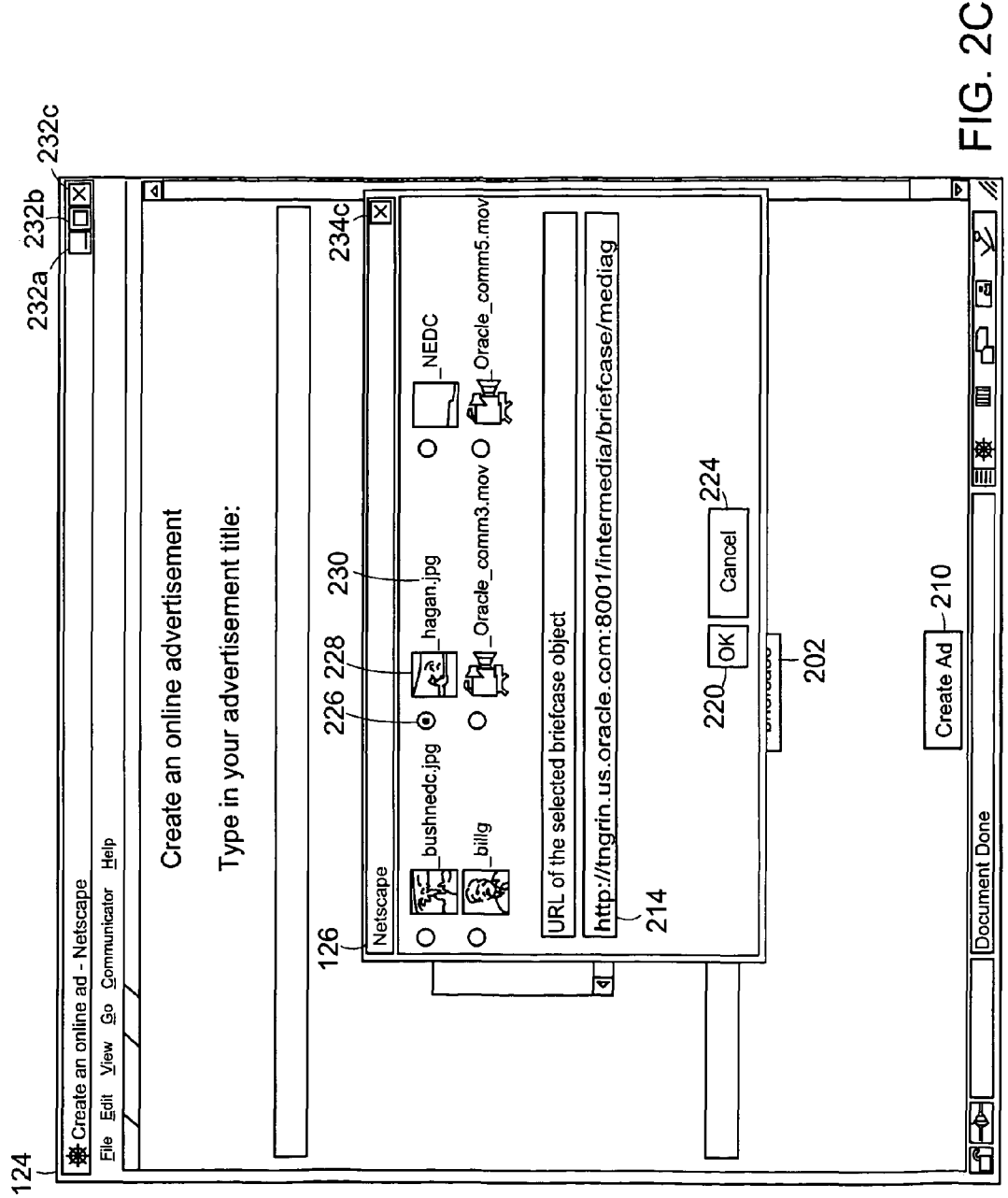
FIG. 2C is the web application's user interface after the user has selected a file in the popup window.

FIG. 2C is the web application's user interface after the user has selected a file in the popup window. An image file hagan.jpg 230 has been selected by selecting the radio button 226 associated with file 230. The URL associated with the selected file is provided to the popup window 126 by the popup servlet 122 (FIG. 1) and displayed in field 214 in the popup window 126. The user selects the OK button 220 to obtain the URL displayed in field 214 to the web application's user interface 124. After the user selects the OK button 220, the popup window 126 is closed, that is, it is no longer displayed on the client 102.

Figure 2D:
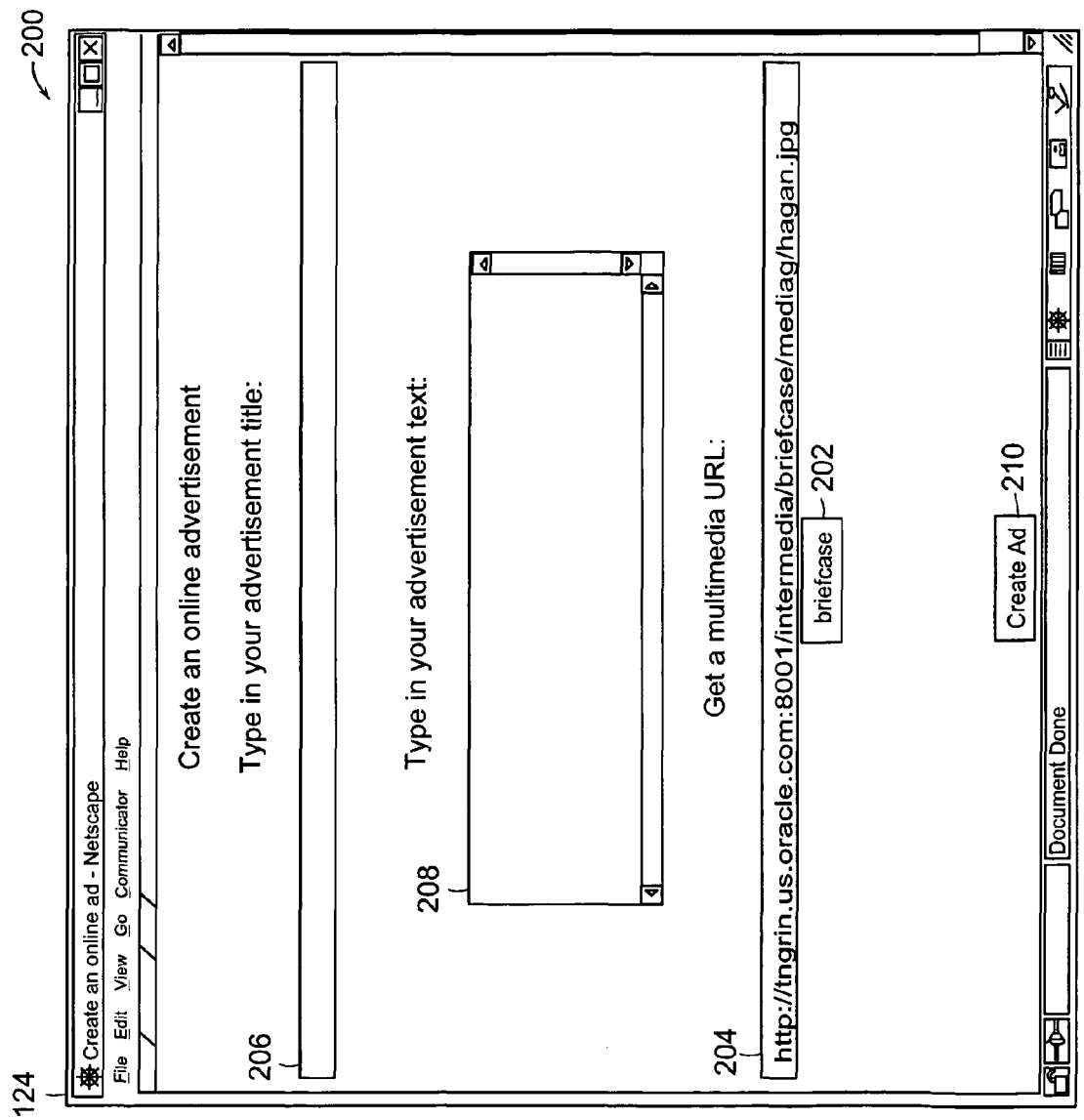
FIG. 2D is the web application's user interface after the user has selected the OK button in the popup window.

FIG. 2D is the web application's user interface after the user has selected the OK button in the popup window. The popup servlet 122 has obtained the URL of the selected file and displayed the URL in field 204 in the web application's user interface 124. The popup window 126 (FIG. 2C) is no longer displayed. Only the URL for the selected file is obtained for the web application's user interface 124 by the popup servlet 122. However, the contents of the file associated with the displayed URL can be directly pulled by the web application 130 using the URL pulled to the web application 130 by the browser 128 after the user selects the "Create Ad" button.

Figure 2E:
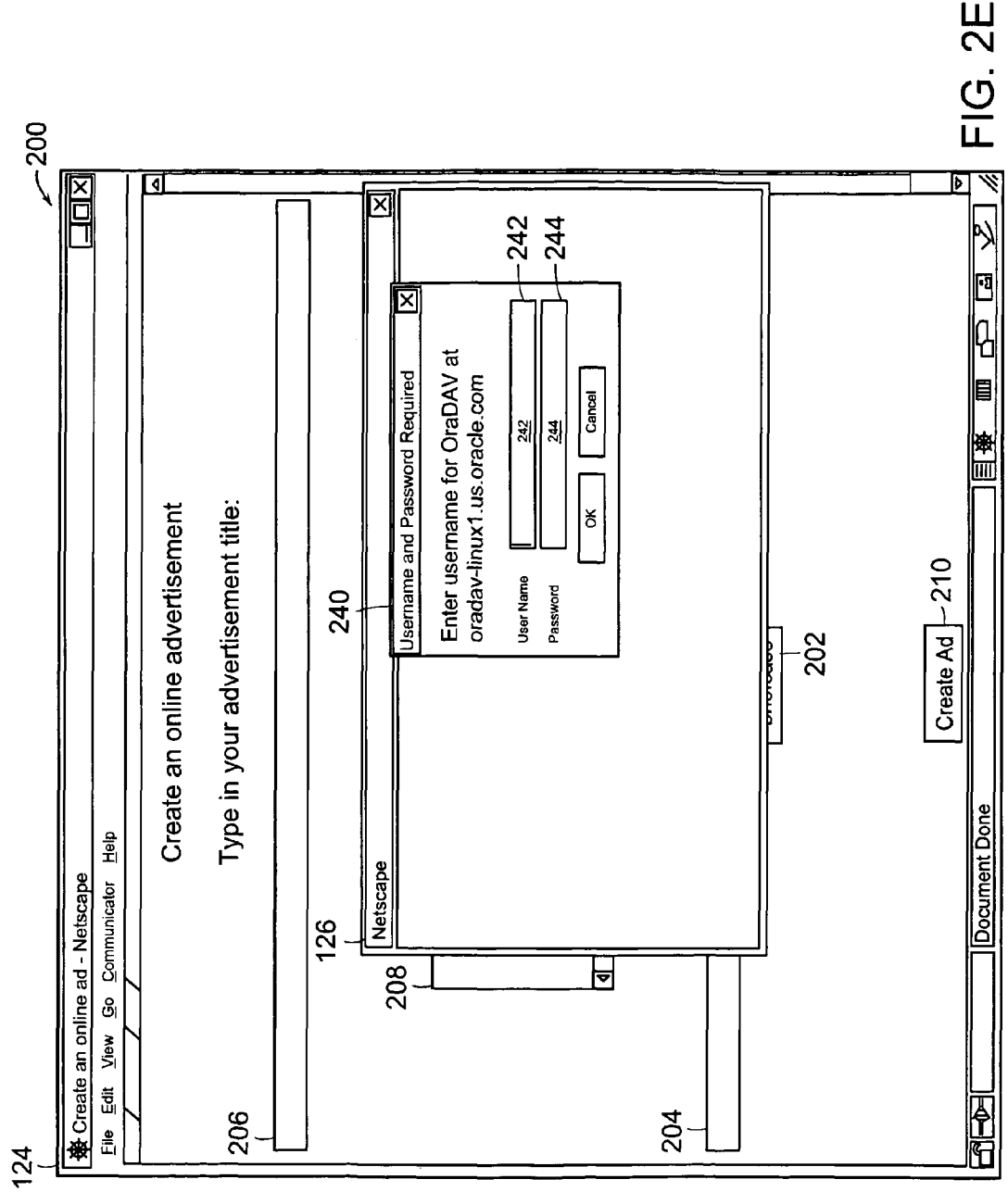
FIG. 2E is the web application's user interface displaying an authentication dialog box.

FIG. 2E is the web application's user interface displaying an authentication dialog box. Authentication can be added to the popup servlet 122 through the use of HTTP's Basic Authentication scheme. In HTTP's Basic Authentication scheme all the authorization information is base-64 encoded and passed in a HTTP header. The browser 130 (FIG. 1) provides a dialog box 240 to prompt a user for a username and password before displaying files stored on on-line remote storage 114 in the database server 108. If authentication is required, the popup servlet 122 sends a HTTP status 401 (Unauthorized) response to the client 102 before displaying the files stored in the user's account on on-line remote storage 114. When the browser 130 sees the 401 status, the browser 130 displays the username and password dialog box 240. The popup window 126 is also displayed but none of the storage content (files and folders) is shown in the popup window 126 until the user has been successfully authenticated, that is, until the user enters a valid username and password combination in the user name field 242 and the password field 244.

A 401 status is sent to the client using the following code where response is a HTTPServletResponse object:
response.setHeader("WWW-Authenticate", "Basic realm=\"Clipboard\"");
response.sendError(HttpServletResponse.SC_UNAUTHORIZED);
return;

The encoded username and password are grabbed from the HTTP header using the following code, where request is a HTTPServletRequest object:
String authInfo=request.getHeader("Authorization");

In an alternative embodiment, the popup servlet 122 can avoid the use of Basic Authentication by providing a HTML page directly in the popup window 126 with two text fields, one for entry of username, and the other for entry of a password. After the user has logged in, the popup window 126 redirects to the formatted popup window shown in FIG. 2B and displays files which are accessible to the user.

Figure 3:
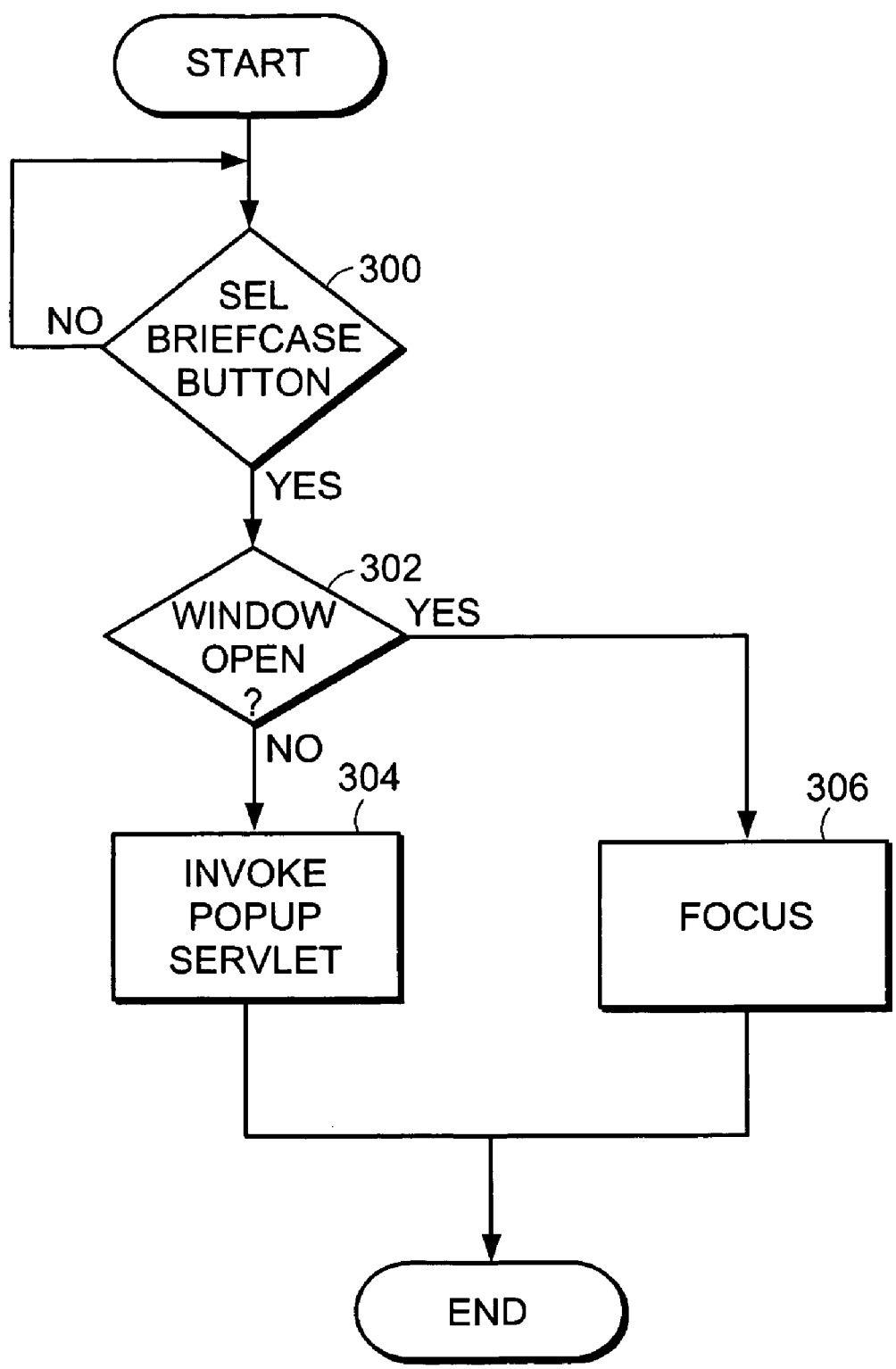
FIG. 3 is a flowchart illustrating the methods included in the web application for invoking the popup servlet shown in FIG. 1.

FIG. 3 is a flowchart illustrating the methods included in the web application 130 for invoking the popup servlet 122 shown in FIG. 1. The flowchart is described in conjunction with FIG. 1 and FIG. 2B. The methods can be implemented as JavaScript code.

At step 300, the web application 130 checks if the briefcase button 202 (FIG. 2B) in the web application's user interface 124 displayed by the browser 128 in the client 102 has been selected. The briefcase button is selected when a user clicks the briefcase button 202 (FIG. 2B). If so, processing continues with step 302.

At step 302, the web application 130 checks if a popup window 126 has already been opened. If so, processing continues with step 306. If not, processing continues with step 304.

At step 304, the web application 130 calls a standard window.open( ) function to open a new browser window of fixed size. For example, the following windows_open( ) call can be made to invoke the popup servlet 122.

window.open("http://host:port/servlet/
PopupServletName?op=showFolderContents&id=X",
"win2", "dependent=yes, scrollbars=yes; menubar=0,
status=0, toolbar=0, resizable=0, screenX=140,
screenY=130, width=425, height=235");

The new browser window opened is the popup window 126. The fixed size popup window 126 is displayed by the browser 128 on the client 102 at a fixed location. In the example above, the fixed size of the popup window 126 is 425 pixels wide and 235 pixels high and the fixed location is at x=140 and y=130 in the user interface. The first argument to the standard windows open function is the URL of the popup servlet 122 in the database server 108, that is, http://host:port/servlet/PopupServletName. When executed, the window.open( ) function sends a HTTP GET request with the first parameter set to the URL of the popup servlet 122. The servlet engine 106 identifies the requested servlet and forwards the HTTP GET request to the popup servlet 122. The popup servlet's GET method processes the received HTTP GET request. Processing of the Java Script code in the web application 130 is complete.

At step 306, a standard windows focus method is called to ensure that the popup window 126 can only be minimized together with the web application's user interface 124. Thus, the popup window 126 behaves like a standard windows "Open as . . . " or "Save as" window. When a user minimizes the window for the web application's user interface 124 while the popup window 126 is open, the popup window 126 is also minimized. When the user maximizes the window for the web-application's user interface 124, the popup window 126 is also maximized and the popup window 126 is displayed on top of the window displaying the web application's user interface 124. Processing is complete.

Figure 4:
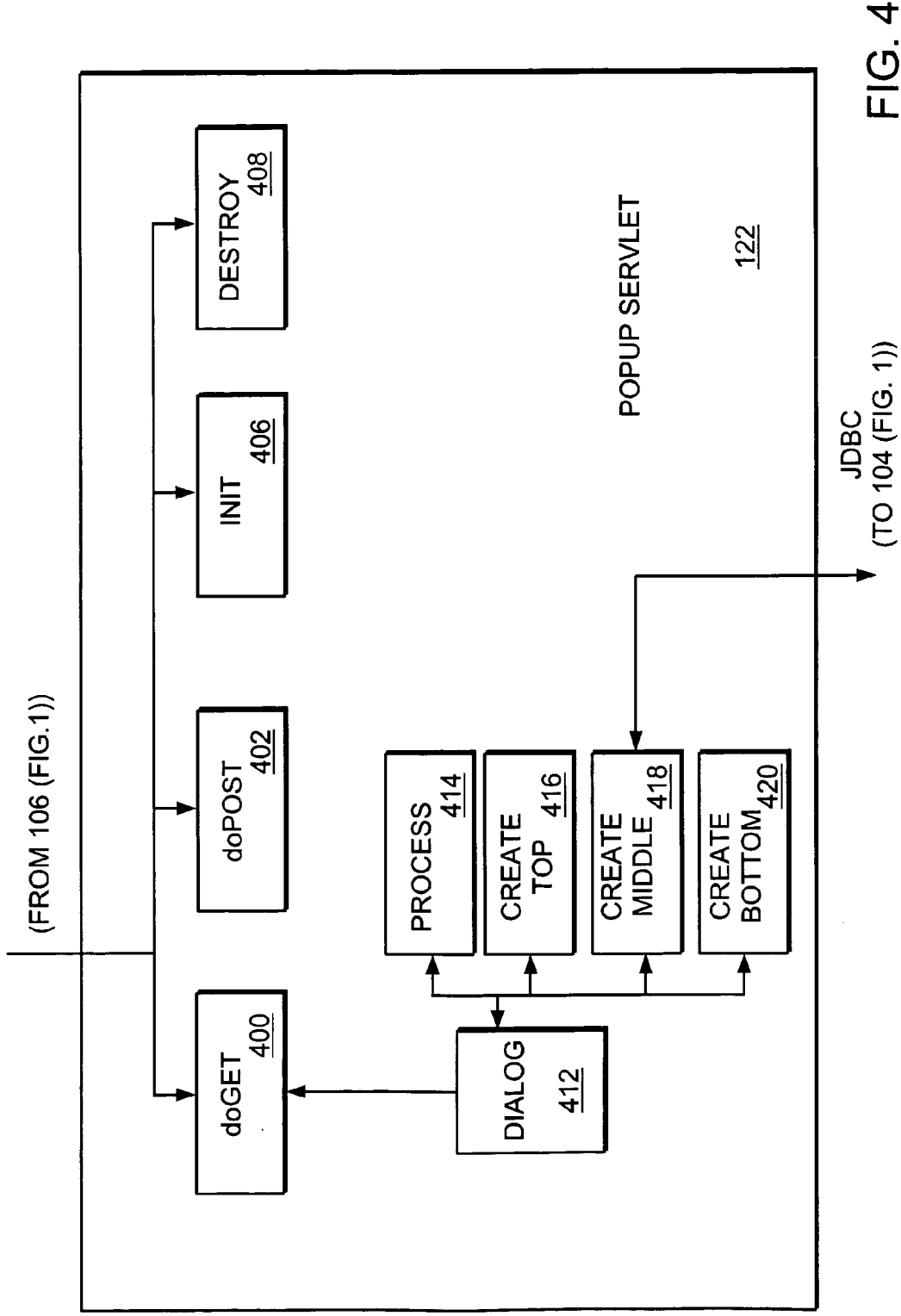
FIG. 4 illustrates methods included in the popup servlet in the database server 108 (FIG. 1)

FIG. 4 illustrates methods included in the popup servlet 122 (FIG. 1) in the database server 108 (FIG. 1). A servlet is a software component written in the Java programming language. The servlet is an independent application executing within the server. A servlet is designed to provide web-based access to data stored on a server which is presented to a user on a client using HTML web pages. A servlet implements a standard servlet interface and typically retrieves parameters through an input stream and sends responses using an output stream.

A servlet includes standard interfaces including a GET method, a POST method, an init method and a destroy method. Data sent from a client 102 to a server 108 is processed by the GET method. Data is returned to the client 102 from the server 108 is processed by the POST method and sent to the server in a HTTP POST request. Thus, the URL is obtained for the web application 130 from the popup servlet 122 using the POST method. The init and destroy methods manage resources used by the popup servlet 122 while the popup servlet 122 is executing.

The servlet engine 106 receives HTTP GET requests from the client 102 and maps the received HTTP requests to the servlet dependent on the servlet's URL. The popup servlet 122 includes standard methods including a doGet method 400, a doPost method 402, an init method 406 and a destroy method 408. The popup servlet 122 is activated by the servlet engine 106 through a call to the init method 406. The init method 406 initializes access to the database in which the files are stored and initializes a network connection for the popup servlet 122.

After the popup servlet 122 is initialized through a call to the init method 406, the popup servlet 122 can handle requests from the client 102. Requests from the client 102 are handled by the doGet method 400 and the doPost method 402 until the popup servlet 122 is explicitly shut down by the database server 108 by a call to the popup servlet's destroy method 408.

When the browser 130 in the client 102 calls the popup servlet 122 by issuing a Get request, the request includes a ServletRequest and a ServletResponse. The ServletRequest encapsulates the communication from the client 102 to the popup servlet 122. The ServletResponse encapsulates the communication from the popup servlet 122 back to the client 102. The popup servlet's Get method 400 is called when the browser 130 in the client 102 makes a HTTP GET request. The popup servlet 122 returns a HTML page to the client 102 encapsulated in the Servlet Response as text data using a writer object.

The Get method 400 includes calls to a dialog method 412. The dialog method 412 includes a process method 414, a CreateTop method 416, a CreateMiddle method 418 and a CreateBottom method 420. The process method 414 is called first to display the popup window 126 in the client 102. The CreateTop method 416, CreateMiddle method 418 and CreateBottom method 420 are called in response to subsequent HTTP GET requests sent by the browser 130 to return the text data to be displayed in the popup window 126 in the Servlet Response to the client 102. The Create Middle method 418 makes a JDBC call to the database to retrieve a list of files stored in the user's on-line remote storage. If user authentication is necessary, it is performed by the CreateMiddle method 400 before making the JDBC call to the database.

Figure 5:
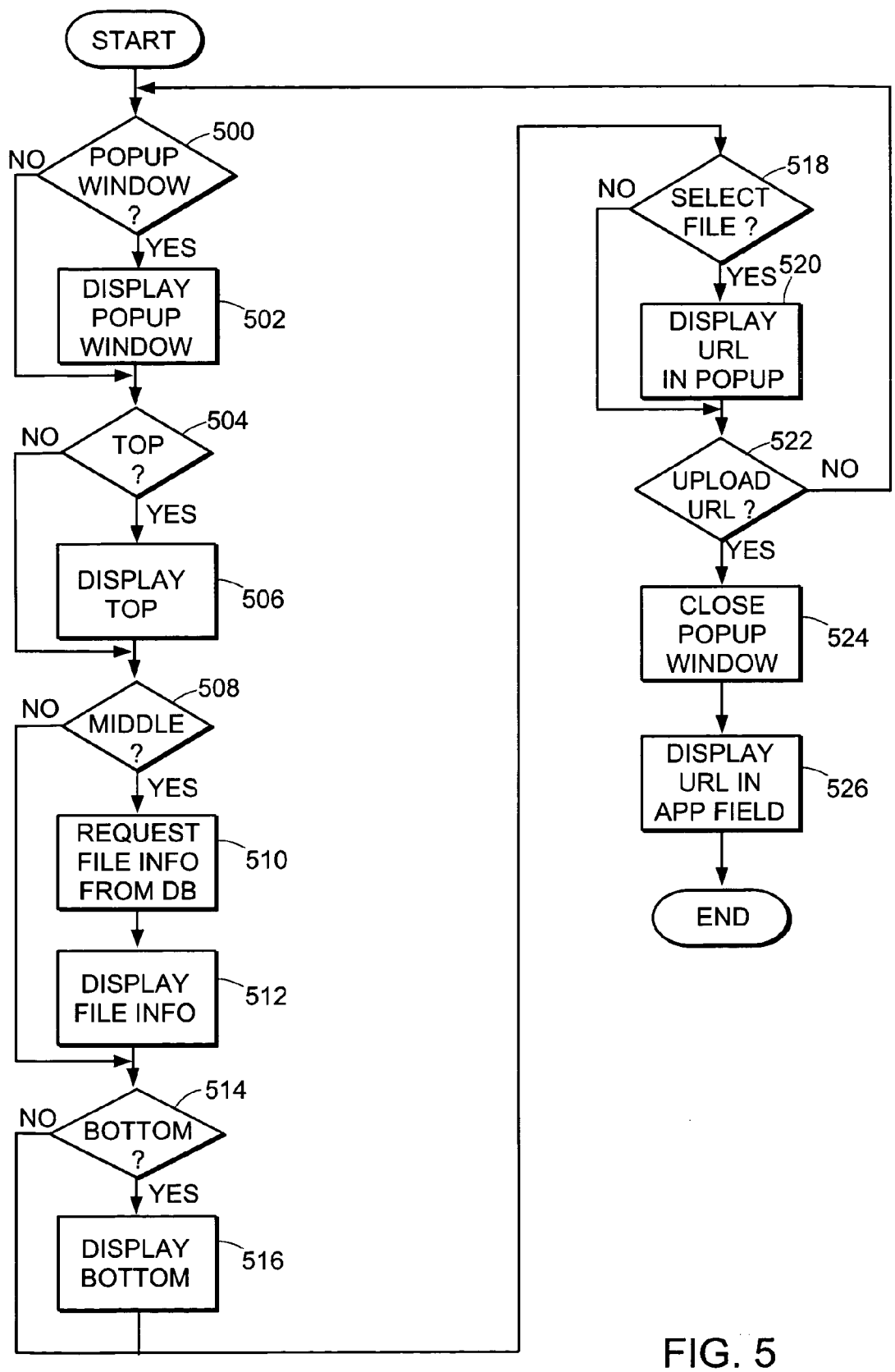
FIG. 5 is a flow chart illustrating the steps implemented in the popup servlet for obtaining a URL associated with a file stored in the database server.

FIG. 5 is a flow chart illustrating the steps implemented in the popup servlet 122 for obtaining a URL associated with a file stored in the database server 108.

At step 500, the doGet( ) method 400 in the popup servlet 122 extracts the parameters and their values from the received HTTP GET request and examines the procedure parameter. The DoGet( ) method 400 calls the process( ) method 414 in the Dialog class if the value of the procedure parameter is "dialog" and processing continues with step 502. If the value of the procedure parameter is not "dialog", processing continues with step 504.

At step 502, the process method 414 generates a HTML page with three frames. The HTML page is sent to the browser 130 for display in the popup window. The HTML page includes three frames, a top frame, middle frame and a bottom frame. Processing continues with step 504.

At step 504, the popup servlet 122 examines the procedure parameter in the HTTP GET request received from the browser 130. If the procedure parameter is set to CreateTop, processing continues with step 506. If not, processing continues with step 508.

At step 506, the CreateTop method 416 is called to generate a HTTP page for the top frame. The HTTP page is returned to the browser 130 for display in the popup window 126. Processing continues with step 504.

At step 508, the popup servlet 122 examines the procedure parameter in the HTTP GET request received from the browser 130. If the procedure parameter is set to CreateMiddle, processing continues with step 510. If not, processing continues with step 514.

At step 510, the CreateMiddle method 418 is called to generate a HTTP page for the middle frame. A JDBC call is made to the database to retrieve files stored in the user's on-line remote storage. Processing continues with step 512.

At step 512, the HTTP page is returned to the browser 130 for display in the popup window 126. The text to be displayed in the popup window 126 on the client 102 is encapsulated in an output stream. The text includes filenames, radio buttons, icons and thumbnail images as shown in FIG. 2B. Processing continues with step 514.

At step 514, the popup servlet 122 examines the procedure parameter in the HTTP GET request received from the browser 130. If the procedure parameter is set to CreateBottom, processing continues with step 516. If not, processing continues with step 518.

At step 516, the CreateBottom method 420 is called to generate a HTTP page for the bottom frame. The HTTP page is returned to the browser 130 for display in the popup window 126. Processing continues with step 518.

At step 518, the popup servlet 122 examines the procedure parameter in the HTTP GET request received from the browser 130. A request for a URL associated with a selected file is sent to the popup servlet 122 through a call to the doGet method 400 after the user has selected a file in the popup window. If the procedure parameter is set to get URL for selected file, processing continues with step 520. If not, processing continues with step 522.

At step 520, the popup servlet 122 returns HTTP text to be displayed on the client by the browser 128. The HTTP text includes the URL of the selected file to be displayed in field 214 in the popup window. Processing continues with step 522.

At step 522, the popup servlet 122 examines the procedure parameter in the HTTP GET request received from the browser 130. If the procedure parameter is set to close popup, processing continues with step 524. If not, processing continues with step 500.

At step 524, the popup window 126 is closed after the OK button 220 is selected by the user. Once the user selects the "OK" button 220 in the popup window 126, a JavaScript function is called to close the popup window 126. Processing continues with step 526.

At step 526, the JavaScript function called to close the popup window 126 also displays the URL for the selected file in field 214 in the web application's user interface. The web application 130 provides the text field name and form name when calling the popup servlet 122 so that the Popup servlet 122 can set the value of text field 214 in the form. Once the URL is displayed in text field 214 in the web application's user interface 124, the URL is available for use by the web application 130.

Figure 6:
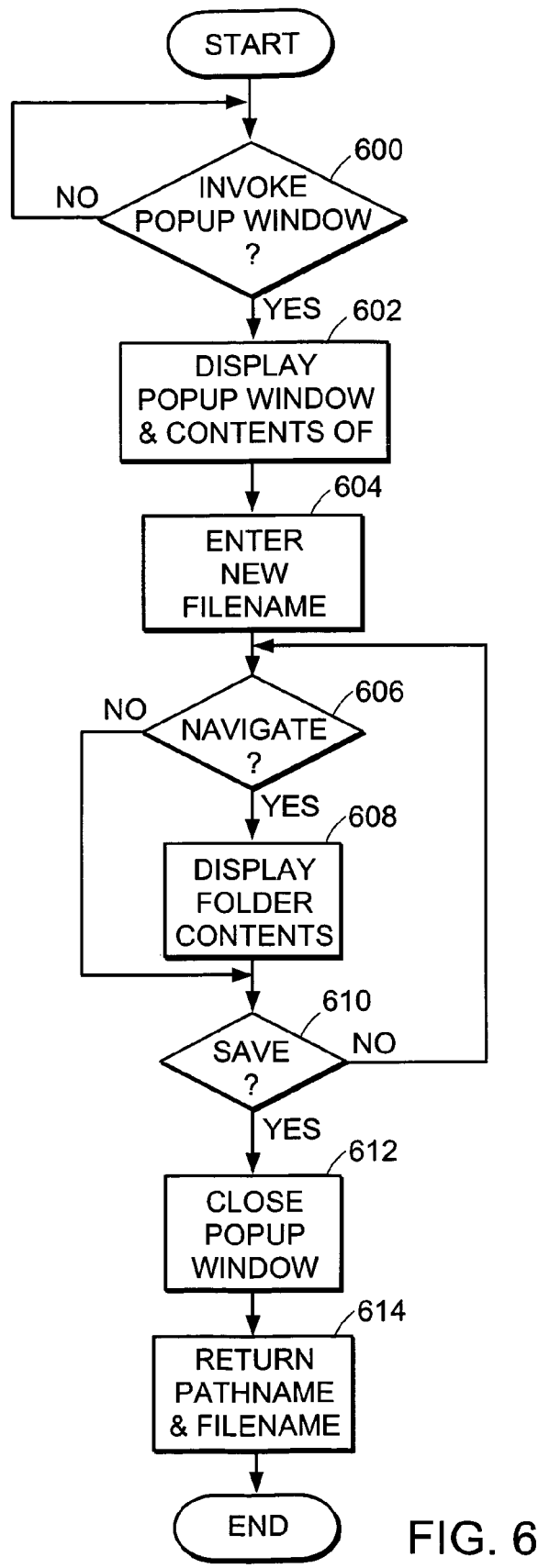
FIG. 6 is a flow chart illustrating the steps implemented in the popup servlet for pushing a file directly from the web server to the database server.

FIG. 6 is a flow chart illustrating the steps implemented in the popup servlet 122 for pushing a file directly from the web server to the database server 108. The web application 130 creates a form ("save-form"). The form is displayed by the browser 128 in the web application's user interface 126 on the client 102. The form includes an action implemented in the web application 130 to process a save-as command.

The web application's user interface 124 includes a popup button similar to the briefcase button 202 described in conjunction with FIG. 2A for invoking the popup servlet 122 when selected. The form also includes a hidden text field including an identifier to keep track of an application entity to be saved into the database, a hidden path field which receives a path name from the popup servlet 122, a hidden file field for receiving a file name from the popup servlet 122. The user must select file to push before invoking the popup window 126.

At step 600, after selecting a file to push to the database, the user selects the popup button in the form and processing continues with step 602. If not, processing continues with step 600, waiting for the button to be selected.

At step 602, the popup window 126 displays the default folder in the database to which the file can be saved. Processing continues with step 604.

At step 604, the user enters a new filename for the file to be pushed. Processing continues with step 606.

At step 606, the popup servlet 122 determines if there is a request to navigate to a new folder. If so, processing continues with step 608. If not, processing continues with step 610.

At step 608, the user can navigate to a new path in the popup window 122. The contents of the new path are retrieved by the popup servlet 122 from the database and returned in a HTTP request to the browser 128 to be displayed in the popup window 126. Processing continues with step 610.

At step 610, after the user has navigated to the folder to which the file is to be saved. The user selects the save button. If the user has selected the save button, processing continues with step 612. If not, processing continues with step 606 to wait for another navigate request from the user.

At step 612, the result of selecting the save button returns the typed in name to the original application form, closes the popup window 126 and submits the form. Processing continues with step 614.

At step 614, a function in the web application 130 is called to store the pathname and the file name so that the file can be pushed directly from the web server 118 to the database server 108. The web application can use the JDBC DriverManager, Connection, PreparedStatement and ResultSet classes to query and update tables in the database. The URL is used to query the database for the location where the pushed content will be stored. The application entity whose location is passed through the hidden field is written to a row in a database table. Processing is complete.

Those of ordinary skill in the art should recognize that methods involved in a network-based file access system may be embodied in a computer program product that includes a computer usable medium. For example, such a computer usable medium can include a readable memory device, such as a solid state memory device, a hard drive device, a CD-ROM, a DVD-ROM, or a computer diskette, having computer readable program code segments stored thereon. The computer readable medium can also include a communications or transmission medium, such as a bus or a communications link, either optical, wired, or wireless, having program code segments carried thereon as digital or analog data signals.

While the system has been particularly shown and described with references to particular embodiments thereof, it will be understood by those skilled in the art that various changes in form and details may be made therein without departing from the scope of the invention. For example, the methods of the invention can be applied to various environments, and are not limited to the environment described herein.

What is claimed is:

1. A computer-implemented method comprising:
    displaying a user interface for a web application, the user interface displayed in a web browser at a client computer, the user interface including a form having fields for receiving content for use by the web application, the web application executing on a server that is remote from the client computer;
    displaying, within a browser window of the user interface, representations of resources stored at a remote storage system, the remote storage system being remote from the client computer and remote from the server;
    in response to receiving a selection of one of the representations of the resources stored at the remote storage system, obtaining, by the client computer, an identifier associated with a file corresponding to the selection, the file being a resource stored at the remote storage system, the client computer obtaining the identifier from the remote storage system, the identifier enabling the web application to directly pull contents of the file from the remote storage system to the server without storing the file on the client computer; and
    forwarding, to the web application, the identifier associated with the file.

2. The computer-implemented method of claim 1, further comprising:
    displaying, within the browser window of the user interface, representations of files stored at the server;
    obtaining, by the client computer, a second identifier, the second identifier associated with a folder at the remote storage system, the client computer obtaining from the remote storage system the second identifier, the second identifier enabling the web application to directly push contents of a given file from the server to the remote storage system; and
    in response to receiving a selection of one of the representations of files stored at the server, forwarding to the web application the second identifier associated with the folder, the second identifier enabling the web application to directly push the contents of a second file from the server to the remote storage system.

3. The computer-implemented method of claim 2, further comprising:
    directly pulling, by the web application, the contents of the file from the remote storage system to the server; and
    directly pushing, by the web application, the contents of the second file from the server to the remote storage system.

4. The computer-implemented method of claim 3, wherein the web application directly pulling the contents of the file includes pulling the contents of the file to the server without storing the contents of the file at the client computer.

5. The computer-implemented method of claim 1, wherein displaying the user interface includes displaying a popup button that initiates display of the representations of resources stored at a remote storage system, the computer-implemented method further comprising:

receiving a selection of the popup button;
wherein displaying the representations of resources is in response to receiving the selection of the popup button;
wherein displaying the representations of resources includes displaying a popup window in the browser on the client computer, the popup window overlaid on the user interface of the web application, the popup window displaying the representations of the resources stored at the remote storage system; and
in response to the client computer obtaining the identifier associated with the file, closing the popup window from display on the client computer.

6. The computer-implemented method of claim 5, further comprising:
displaying, within the browser window of the user interface, representations of files stored at the server;
obtaining, by the client computer, a second identifier, the second identifier associated with a folder at the remote storage system, the client computer obtaining from the remote storage system the second identifier, the second identifier enabling the web application to directly push contents of a given file from the server to the remote storage system; and
in response to receiving a selection of one of the representations of files stored at the server, forwarding to the web application the second identifier associated with the folder, the second identifier enabling the web application to directly push the contents of a second file from the server to the remote storage system.

7. The computer-implemented method of claim 1, further comprising:
performing user authentication before displaying the representations of resources stored at a remote storage system.

8. The computer-implemented method of claim 1, wherein the representations of resources displayed include the contents of a user's account stored on the remote storage system.

9. The computer-implemented method of claim 1, wherein displaying representations of resources stored at a remote storage system, includes issuing a database query to a database stored on the remote storage system.

10. The computer-implemented method of claim 1, wherein the second identifier associated with the folder to push the second file is a Uniform Resource Locator.

11. A computer-implemented method comprising:
displaying a user interface for a web application that includes a popup button that initiates display of the representations of resources stored at a remote storage system, the user interface displayed in a web browser at a client computer, the user interface including a form having fields for receiving content for use by the web application, the web application executing on a server that is remote from the client computer;
receiving a selection of the popup button;
in response to receiving the selection of the popup button, displaying a popup window of the user interface, the popup window overlaid on the user interface of the web application, the popup window displaying representations of resources stored at a remote storage system, the remote storage system being remote from the client computer and remote from the server;
in response to receiving a selection of one of the representations of the resources stored at the remote storage system, obtaining, by the client computer, an identifier associated with a file corresponding to the selection, the file being a resource stored at the remote storage system, the client computer obtaining the identifier from the remote storage system, the identifier enabling the web application to directly pull contents of the file from the remote storage system to the server;
in response to the client computer obtaining the identifier associated with the file, closing the popup window from display on the client computer; and
forwarding, to the web application, the identifier associated with the file.

12. The computer-implemented method of claim 11, further comprising:
displaying, within the popup window of the user interface, representations of files stored at the server;
obtaining, by the client computer, a second identifier, the second identifier associated with a folder at the remote storage system, the client computer obtaining from the remote storage system the second identifier, the second identifier enabling the web application to directly push contents of a given file from the server to the remote storage system; and
in response to receiving a selection of one of the representations of files stored at the server, forwarding to the web application the second identifier associated with the folder, the second identifier enabling the web application to directly push the contents of a second file from the server to the remote storage system.

13. The computer-implemented method of claim 12, further comprising:
performing user authentication before displaying the representations of resources stored at a remote storage system.

14. The computer-implemented method of claim 12, wherein the representations of resources displayed include the contents of a user's account stored on the remote storage system.

15. The computer-implemented method of claim 12, wherein displaying representations of resources stored at a remote storage system, includes issuing a database query to a database stored on the remote storage system.

16. The computer-implemented method of claim 12, wherein the second identifier associated with the folder to push the second file is a Uniform Resource Locator.

17. A computer-implemented method comprising:
displaying a user interface for a web application that includes a first popup button that initiates display of the representations of resources stored at a web server for pushing a file directly from the web server to a remote storage system, the user interface displayed in a web browser at a client computer, the user interface including a form having fields for receiving content for use by the web application, the web application executing on a server that is remote from the client computer;
receiving a selection of the first popup button associated with the web application for invoking a popup window;
in response to receiving the selection of the first popup button, displaying the popup window of the user interface, the popup window overlaid on the user interface of the web application, the popup window displaying representations of resources stored at the web server, the web server being remote from the client computer and remote from the server;
receiving a selection of a file to push to the remote storage system;
receiving a selection of a second popup button, the second popup button associated with the remote storage system;
in response to receiving the selection of the second popup button, displaying a file folder navigation menu for selection a save location at the remote storage system;

transmitting a file name and a selection of a folder location at the remote storage system to store the file from the web server;

in response to transmitting the file name and folder selection, the client computer obtaining, from the remote storage system, an identifier for identifying a file path name and location at the remote storage system; and the client computer forwarding the identifier to the web server for pushing the file, at the web server, directly to the remote storage system.

18. The computer-implemented method of claim 17, wherein the web application directly pushing the contents of the file includes pushing the contents of the file to the remote storage system without storing the contents of the file at the client computer.

19. The computer-implemented method of claim 17, further comprising:

performing user authentication before displaying the representations of resources stored at the web server.

20. The computer-implemented method of claim 17, wherein the identifier associated with the folder to save the file is a Uniform Resource Locator.

21. A computer system comprising:

a processor;

a memory unit that stores instructions associated with an application executed by the processor; and an interconnect coupling the processor and the memory unit, enabling the computer system to execute the application and perform operations of:

displaying a user interface for a web application, the user interface displayed in a web browser at a client computer, the user interface including a form having fields for receiving content for use by the web application, the web application executing on a server that is remote from the client computer;

displaying, within a browser window of the user interface, representations of resources stored at a remote storage system, the remote storage system being remote from the client computer and remote from the server;

in response to receiving a selection of one of the representations of the resources stored at the remote storage system, obtaining, by the client computer, an identifier associated with a file corresponding to the selection, the file being a resource stored at the remote storage system, the client computer obtaining the identifier from the remote storage system, the identifier enabling the web application to directly pull contents of the file from the remote storage system to the server without storing the file on the client computer; and forwarding, to the web application, the identifier associated with the file.

22. The computer system of claim 21, wherein the processor is further enabled to perform the operations of:

displaying, within the browser window of the user interface, representations of files stored at the server;

obtaining, by the client computer, a second identifier, the second identifier associated with a folder at the remote storage system, the client computer obtaining from the remote storage system the second identifier, the second identifier enabling the web application to directly push contents of a given file from the server to the remote storage system; and in response to receiving a selection of one of the representations of files stored at the server, forwarding to the web application the second identifier associated with the folder, the second identifier enabling the web application to directly push the contents of a second file from the server to the remote storage system.

23. The computer system of claim 22, wherein the processor is further enabled to perform the operations of:

directly pulling, by the web application, the contents of the file from the remote storage system to the server; and directly pushing, by the web application, the contents of the second file from the server to the remote storage system.

24. The computer system of claim 23, wherein the web application directly pulling the contents of the file includes pulling the contents of the file to the server without storing the contents of the file at the client computer.

25. The computer system of claim 21, wherein the processor executing the operations of displaying the user interface includes displaying a popup button that initiates display of the representations of resources stored at a remote storage system, the processor is further enabled to perform the operations of:

receiving a selection of the popup button;

wherein displaying the representations of resources is in response to receiving the selection of the popup button;

wherein displaying the representations of resources includes displaying a popup window in the browser on the client computer, the popup window overlaid on the user interface of the web application, the popup window displaying the representations of the resources stored at the remote storage system; and in response to the client computer obtaining the identifier associated with the file, closing the popup window from display on the client computer.

26. The computer system of claim 25, wherein the processor is further enabled to perform the operations of:

displaying, within the browser window of the user interface, representations of files stored at the server;

obtaining, by the client computer, a second identifier, the second identifier associated with a folder at the remote storage system, the client computer obtaining from the remote storage system the second identifier, the second identifier enabling the web application to directly push contents of a given file from the server to the remote storage system; and in response to receiving a selection of one of the representations of files stored at the server, forwarding to the web application the second identifier associated with the folder, the second identifier enabling the web application to directly push the contents of a second file from the server to the remote storage system.

27. The computer system of claim 21, wherein the processor is further enabled to perform the operations of:

performing user authentication before displaying the representations of resources stored at a remote storage system.

28. The computer system of claim 21, wherein the representations of resources displayed include the contents of a user's account stored on the remote storage system.

29. The computer system of claim 21, wherein displaying representations of resources stored at a remote storage system, includes issuing a database query to a database stored on the remote storage system.

30. The computer system of claim 21, wherein the second identifier associated with the folder to push the second file is a Uniform Resource Locator.

31. A computer program product including a non-transitory computer-storage medium having instructions stored thereon for processing data information, such that the instructions, when carried out by a processing device, enable the processing device to perform the operations of:

displaying a user interface for a web application, the user interface displayed in a web browser at a client computer, the user interface including a form having fields for receiving content for use by the web application, the web application executing on a server that is remote from the client computer; displaying, within a browser window of the user interface, representations of resources stored at a remote storage system, the remote storage system being remote from the client computer and remote from the server;

in response to receiving a selection of one of the representations of the resources stored at the remote storage system, obtaining, by the client computer, an identifier associated with a file corresponding to the selection, the file being a resource stored at the remote storage system, the client computer obtaining the identifier from the remote storage system, the identifier enabling the web application to directly pull contents of the file from the remote storage system to the server without storing the file on the client computer; and forwarding, to the web application, the identifier associated with the file.

32. The computer program product of claim 31, further comprising:

displaying, within the browser window of the user interface, representations of files stored at the server;

obtaining, by the client computer, a second identifier, the second identifier associated with a folder at the remote storage system, the client computer obtaining from the remote storage system the second identifier, the second identifier enabling the web application to directly push contents of a given file from the server to the remote storage system; and in response to receiving a selection of one of the representations of files stored at the server, forwarding to the web application the second identifier associated with the folder, the second identifier enabling the web application to directly push the contents of a second file from the server to the remote storage system.

33. The computer program product of claim 32, further comprising:

directly pulling, by the web application, the contents of the file from the remote storage system to the server; and directly pushing, by the web application, the contents of the second file from the server to the remote storage system.

34. The computer program product of claim 33, wherein the web application directly pulling the contents of the file includes pulling the contents of the file to the server without storing the contents of the file at the client computer.

35. The computer program product of claim 31, wherein displaying the user interface includes displaying a popup button that initiates display of the representations of resources stored at a remote storage system, the computer program product further comprising:

receiving a selection of the popup button;

wherein displaying the representations of resources is in response to receiving the selection of the popup button;

wherein displaying the representations of resources includes displaying a popup window in the browser on the client computer, the popup window overlaid on the user interface of the web application, the popup window displaying the representations of the resources stored at the remote storage system; and in response to the client computer obtaining the identifier associated with the file, closing the popup window from display on the client computer.

36. The computer program product of claim 35, further comprising:

displaying, within the browser window of the user interface, representations of files stored at the server;

obtaining, by the client computer, a second identifier, the second identifier associated with a folder at the remote storage system, the client computer obtaining from the remote storage system the second identifier, the second identifier enabling the web application to directly push contents of a given file from the server to the remote storage system; and in response to receiving a selection of one of the representations of files stored at the server, forwarding to the web application the second identifier associated with the folder, the second identifier enabling the web application to directly push the contents of a second file from the server to the remote storage system.

37. The computer program product of claim 31, further comprising:

performing user authentication before displaying the representations of resources stored at a remote storage system.

38. The computer program product of claim 31, wherein the representations of resources displayed include the contents of a user's account stored on the remote storage system.

39. The computer program product of claim 31, wherein displaying representations of resources stored at a remote storage system, includes issuing a database query to a database stored on the remote storage system.

40. The computer program product of claim 31, wherein the second identifier associated with the folder to push the second file is a Uniform Resource Locator.

41. A computer system comprising:

a processor;

a memory unit that stores instructions associated with an application executed by the processor; and an interconnect coupling the processor and the memory unit, enabling the computer system to execute the application and perform operations of:

displaying a user interface for a web application that includes a popup button that initiates display of the representations of resources stored at a remote storage system, the user interface displayed in a web browser at a client computer, the user interface including a form having fields for receiving content for use by the web application, the web application executing on a server that is remote from the client computer;

receiving a selection of the popup button;

in response to receiving the selection of the popup button, displaying a popup window of the user interface, the popup window overlaid on the user interface of the web application, the popup window displaying representations of resources stored at a remote storage system, the remote storage system being remote from the client computer and remote from the server;

in response to receiving a selection of one of the representations of the resources stored at the remote storage system, obtaining, by the client computer, an identifier associated with a file corresponding to the selection, the file being a resource stored at the remote storage system, the client computer obtaining the identifier from the remote storage system, the identifier enabling the web application to directly pull contents of the file from the remote storage system to the server;

in response to the client computer obtaining the identifier associated with the file, closing the popup window from display on the client computer; and forwarding, to the web application, the identifier associated with the file.

42. The computer system of claim 41, wherein the processor is further enabled to perform the operations of:

displaying, within the browser window of the user interface, representations of files stored at the server;

obtaining, by the client computer, a second identifier, the second identifier associated with a folder at the remote storage system, the client computer obtaining from the remote storage system the second identifier, the second identifier enabling the web application to directly push contents of a given file from the server to the remote storage system; and in response to receiving a selection of one of the representations of files stored at the server, forwarding to the web application the second identifier associated with the folder, the second identifier enabling the web application to directly push the contents of a second file from the server to the remote storage system.

43. A computer program product including a computer-storage medium having instructions stored thereon for processing data information, such that the instructions, when carried out by a processing device, enable the processing device to perform the operations of:

displaying a user interface for a web application that includes a popup button that initiates display of the representations of resources stored at a remote storage system, the user interface displayed in a web browser at a client computer, the user interface including a form having fields for receiving content for use by the web application, the web application executing on a server that is remote from the client computer;

receiving a selection of the popup button;

in response to receiving the selection of the popup button, displaying a popup window of the user interface, the popup window overlaid on the user interface of the web application, the popup window displaying representations of resources stored at a remote storage system, the remote storage system being remote from the client computer and remote from the server;

in response to receiving a selection of one of the representations of the resources stored at the remote storage system, obtaining, by the client computer, an identifier associated with a file corresponding to the selection, the file being a resource stored at the remote storage system, the client computer obtaining the identifier from the remote storage system, the identifier enabling the web application to directly pull contents of the file from the remote storage system to the server;

in response to the client computer obtaining the identifier associated with the file, closing the popup window from display on the client computer; and forwarding, to the web application, the identifier associated with the file.

44. The computer program product of claim 43, further comprising:

displaying, within the browser window of the user interface, representations of files stored at the server;

obtaining, by the client computer, a second identifier, the second identifier associated with a folder at the remote storage system, the client computer obtaining from the remote storage system the second identifier, the second identifier enabling the web application to directly push contents of a given file from the server to the remote storage system; and in response to receiving a selection of one of the representations of files stored at the server, forwarding to the web application the second identifier associated with the folder, the second identifier enabling the web application to directly push the contents of a second file from the server to the remote storage system.

45. A computer system comprising:

a processor;

a memory unit that stores instructions associated with an application executed by the processor; and an interconnect coupling the processor and the memory unit, enabling the computer system to execute the application and perform operations of:

displaying a user interface for a web application that includes a first popup button that initiates display of the representations of resources stored at a web server for pushing a file directly from the web server to a remote storage system, the user interface displayed in a web browser at a client computer, the user interface including a form having fields for receiving content for use by the web application, the web application executing on a server that is remote from the client computer;

receiving a selection of the first popup button associated with the web application for invoking a popup window;

in response to receiving the selection of the first popup button, displaying the popup window of the user interface, the popup window overlaid on the user interface of the web application, the popup window displaying representations of resources stored at the web server, the web server being remote from the client computer and remote from the server;

receiving a selection of a file to push to the remote storage system;

receiving a selection of a second popup button, the second popup button associated with the remote storage system;

in response to receiving the selection of the second popup button, displaying a file folder navigation menu for selection a save location at the remote storage system;

transmitting a file name and a selection of a folder location at the remote storage system to store the file from the web server;

in response to transmitting the file name and folder selection, the client computer obtaining, from the remote storage system, an identifier for identifying a file path name and location at the remote storage system; and the client computer forwarding the identifier to the web server for pushing the file, at the web server, directly to the remote storage system.

* * * * *